United States Patent
Tadokoro et al.

(10) Patent No.: US 11,064,292 B2
(45) Date of Patent: Jul. 13, 2021

(54) ACOUSTIC TRANSMISSION MEMBER AND METHOD OF DESIGNING SAME

(71) Applicant: The Yokohama Rubber Co., LTD., Tokyo (JP)

(72) Inventors: Masato Tadokoro, Hiratsuka (JP); Yusuke Tanaka, Hiratsuka (JP)

(73) Assignee: The Yokohama Rubber Co., LTD.

(*) Notice: Subject to any disclaimer, the term of this patent is extended or adjusted under 35 U.S.C. 154(b) by 338 days.

(21) Appl. No.: 16/087,067

(22) PCT Filed: Mar. 2, 2017

(86) PCT No.: PCT/JP2017/008274
§ 371 (c)(1),
(2) Date: Sep. 20, 2018

(87) PCT Pub. No.: WO2017/163804
PCT Pub. Date: Sep. 28, 2017

(65) Prior Publication Data
US 2019/0104358 A1 Apr. 4, 2019

(30) Foreign Application Priority Data
Mar. 23, 2016 (JP) ................................. 2016-057857

(51) Int. Cl.
*H04R 1/44* (2006.01)
*B32B 7/02* (2019.01)
(Continued)

(52) U.S. Cl.
CPC ............... *H04R 1/44* (2013.01); *B29C 70/00* (2013.01); *B32B 7/02* (2013.01); *B32B 7/022* (2019.01);
(Continued)

(58) Field of Classification Search
CPC .......................... G01V 1/201; G01S 7/52004
See application file for complete search history.

(56) References Cited

U.S. PATENT DOCUMENTS 2,960,175 A   11/1960   Mcmillan
4,997,705 A    3/1991   Caprette, Jr. et al.
(Continued)

FOREIGN PATENT DOCUMENTS

CN    103242752 A   *   8/2013   ............... C09J 7/38
CN    105158729 A   *  12/2015
(Continued)

OTHER PUBLICATIONS

Machine Translation of CN105158729 Provided (Year: 2015).*
(Continued)

*Primary Examiner* — Isam A Alsomiri
*Assistant Examiner* — Abdallah Abulaban
(74) *Attorney, Agent, or Firm* — Thorpe North & Western (57) ABSTRACT

The present technology provides an acoustic transmission member that includes a core layer layered between two skin layers, the skin layers being formed of a material having a higher elastic modulus than a material of the core layer. A thickness ds of the skin layers is formed such that Equation (1) is satisfied, where f is the center frequency of the transmission frequency band, cw is the acoustic velocity in the medium surrounding the acoustic transmission member, λ is the wavelength corresponding to the center frequency in the medium, Cds is the longitudinal wave acoustic velocity in the skin layer, and n is a discretionary natural number.

$$ds = \frac{n}{2}\frac{Cds}{cw}\lambda = \frac{n}{2}\frac{Cds}{f} \quad (1)$$

15 Claims, 8 Drawing Sheets

(51) Int. Cl.

| | |
|---|---|
| *B63B 49/00* | (2006.01) |
| *G01S 7/521* | (2006.01) |
| *B32B 7/022* | (2019.01) |
| *B32B 15/08* | (2006.01) |
| *B32B 15/04* | (2006.01) |
| *B32B 15/20* | (2006.01) |
| *B32B 25/08* | (2006.01) |
| *B32B 27/18* | (2006.01) |
| *B32B 25/04* | (2006.01) |
| *B32B 27/08* | (2006.01) |
| *G10K 11/18* | (2006.01) |
| *B32B 15/06* | (2006.01) |
| *B32B 25/02* | (2006.01) |
| *B32B 27/40* | (2006.01) |
| *B29C 70/00* | (2006.01) |
| *B32B 25/10* | (2006.01) |
| *B32B 15/095* | (2006.01) |
| *B32B 27/12* | (2006.01) |

(52) U.S. Cl.
CPC ............ *B32B 15/046* (2013.01); *B32B 15/06* (2013.01); *B32B 15/08* (2013.01); *B32B 15/095* (2013.01); *B32B 15/20* (2013.01); *B32B 25/02* (2013.01); *B32B 25/047* (2013.01); *B32B 25/08* (2013.01); *B32B 25/10* (2013.01); *B32B 27/08* (2013.01); *B32B 27/12* (2013.01); *B32B 27/18* (2013.01); *B32B 27/40* (2013.01); *B63B 49/00* (2013.01); *G01S 7/521* (2013.01); *G10K 11/18* (2013.01); *B32B 2250/03* (2013.01); *B32B 2250/24* (2013.01); *B32B 2250/40* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2264/101* (2013.01); *B32B 2307/10* (2013.01); *B32B 2307/51* (2013.01); *B32B 2307/732* (2013.01)

(56) References Cited

U.S. PATENT DOCUMENTS

| | | | |
|---|---|---|---|
| 6,831,876 | B1 | 12/2004 | Cartwright |
| 2011/0044128 | A1* | 2/2011 | Storteig ................ G01V 1/201 367/20 |
| 2015/0094000 | A1* | 4/2015 | Aigner ............... H03H 9/02102 455/73 |
| 2015/0270623 | A1* | 9/2015 | Liu .................... H01Q 15/0026 343/755 |
| 2015/0369907 | A1* | 12/2015 | Finck .................. G10K 11/006 181/290 |
| 2016/0299220 | A1 | 10/2016 | Tadokoro et al. |

FOREIGN PATENT DOCUMENTS

| | | | | |
|---|---|---|---|---|
| EP | 0173864 B1 | * | 7/1989 | ............ G10K 11/02 |
| EP | 1156891 B1 | * | 11/2005 | ........... B06B 1/0688 |
| JP | H04-050683 | | 2/1992 | |
| JP | 2004170135 A | * | 6/2004 | ......... G01N 27/4071 |
| JP | 4406023 B2 | * | 1/2010 | ............. H01S 5/026 |
| JP | 2015-098086 | | 5/2015 | |
| JP | 5749679 B2 | * | 7/2015 | |
| KR | 20110048052 A | * | 5/2011 | ........... B29C 70/088 |
| WO | WO 2005/010863 | | 2/2005 | |
| WO | WO 2015/072455 | | 5/2015 | |
| WO | WO-2016012779 A1 | * | 1/2016 | ............. B32B 27/12 |

OTHER PUBLICATIONS

International Search Report for International Application No. PCT/JP2017/008274 dated May 30, 2017, 4 pages, Japan.
European Office Action for European Application No. 17769849.5 dated Oct. 23, 2019, 10 pages, Germany.

\* cited by examiner

| CORE LAYER THICKNESS (mm) | SKIN 2.5 mm | SKIN 3 mm |
| --- | --- | --- |
| 0.5 | 4.997429 | 1.440289 |
| 1 | 1.3838 | 1.872441 |
| 2 | 3.815328 | 1.760829 |
| 3 | 5.574187 | 1.65884 |
| 4 | 4.455049 | 1.959133 |
| 5 | 2.095506 | 2.2659 |
| 6 | 3.881176 | 2.208325 |
| 7 | 5.797695 | 2.095015 |
| 8 | 5.06957 | 2.340505 |
| 9 | 2.839688 | 2.655658 |
| 10 | 4.004567 | 2.648572 |

(PRIOR ART)

FIG. 15

*(PRIOR ART)*

FIG. 16

*(PRIOR ART)*

FIG. 17

*(PRIOR ART)*

FIG. 18

ACOUSTIC TRANSMISSION MEMBER AND METHOD OF DESIGNING SAME

TECHNICAL FIELD

The present technology relates to an acoustic transmission member having acoustic transmission properties and a method of designing the same.

BACKGROUND ART

In the related art, acoustic transmission members having acoustic transmission properties have been used for an acoustic transmission region of a device such as a marine sonar. A member formed of steel is a typical example of a known acoustic transmission member, but rubber acoustic transmission members such as rubber domes or rubber windows are known as an enhanced structure for the conventional acoustic transmission members. Such known acoustic transmission members are essentially single layer structures with excellent acoustic transmission characteristics in the low frequency region of a few kHz or less, but are difficult to use in a high frequency band of 20 kHz or greater.

In U.S. Pat. No. 4,997,705 below, an acoustic transmission member that employs a sandwich structure in which both surfaces of a core layer are covered by skin layers is described.

Figure 15:
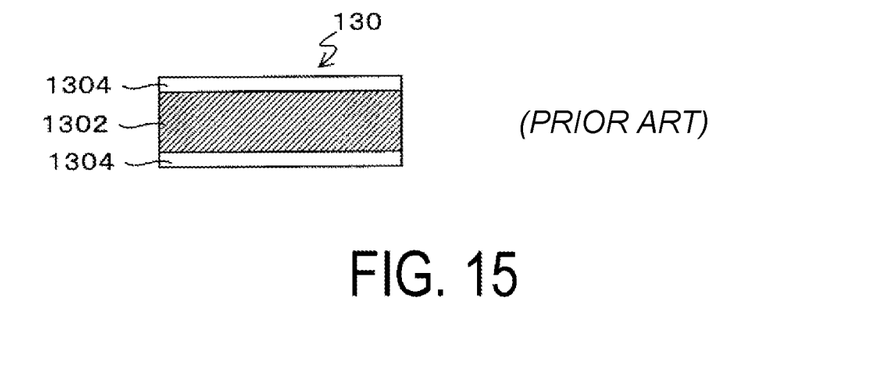
FIG. 15 is an explanatory drawing illustrating a structure of an acoustic transmission member according to U.S. Pat. No. 4,997,705.

FIG. 15 is an explanatory diagram illustrating a structure of the acoustic transmission member according to U.S. Pat. No. 4,997,705. In an acoustic transmission member 130 illustrated in FIG. 15, natural rubber having a thickness of 5 mm is used for the core layer 1302, and carbon fiber reinforced plastics (CFRP) having a thickness of 2 mm is used for the skin layers 1304.

According to this structure, it is possible to form an acoustic transmission member that transmits, in addition to frequencies of the low frequency region where known acoustic transmission members can attain acoustic transmission properties, a frequency f that satisfies Equations (2) and (3) below as the center frequency of a predetermined frequency band. In Equations (2) and (3) below, dc denotes the thickness of the core layer 1302, C denotes the acoustic velocity in the core layer 1302, and C0 denotes the acoustic velocity of the surrounding medium.

$$dc = \frac{\lambda}{2} \frac{C0}{C} \quad (2)$$

$$f = \frac{C0}{\lambda} \quad (3)$$

A viscoelastic member such as rubber or urethane is used for the core layer of the acoustic transmission member 130 according to U.S. Pat. No. 4,997,705 illustrated in FIG. 15. Such a viscoelastic member has temperature characteristics, and depending on the change in temperature, the acoustic velocity in the viscoelastic member (C in Equation (2) described above) also changes. The acoustic velocity in the surrounding medium (C0 in Equation (2) described above) also changes depending on the temperature. As a result, the frequency f indicated in Equation (3) described above shifts due to the temperature, resulting in a large impact on system performance.

Figure 16:
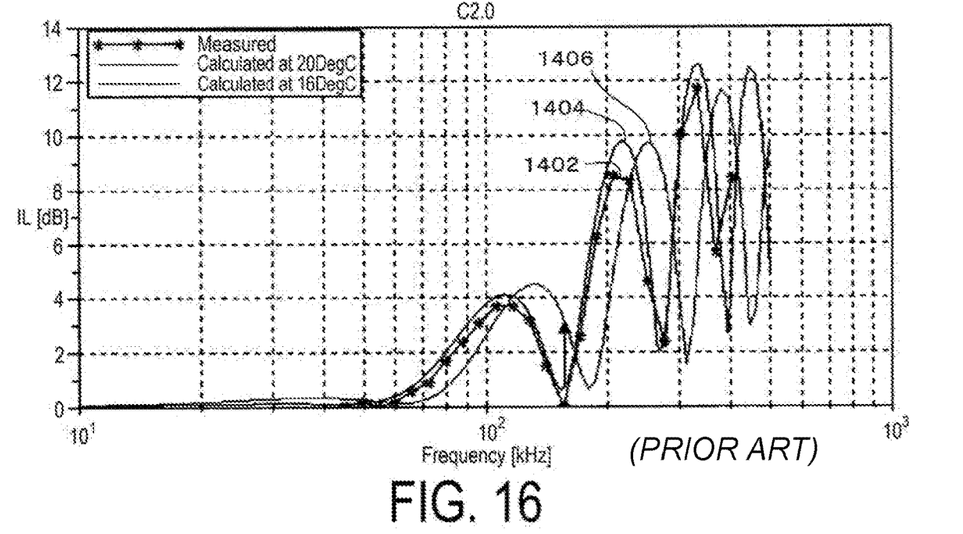
FIG. 16 is a graph showing transmission characteristics of the acoustic transmission member illustrated in FIG. 15.

FIG. 16 is a graph showing transmission characteristics of the acoustic transmission member illustrated in FIG. 15.

In FIG. 16, the vertical axis indicates transmission loss IL, and the horizontal axis indicates frequency. In the graph, reference sign 1402 denotes values obtained by actual measurement about acoustic transmission characteristics of the acoustic transmission member illustrated in FIG. 15 in 20° C. water. Reference sign 1404 denotes calculated values obtained by modeling acoustic transmission characteristics in 20° C. water according to the actually measured values denoted by reference sign 1402, and reference sign 1406 denotes values obtained by calculating the acoustic transmission characteristics in 16° C. water on the basis of the calculated values indicated by reference sign 1404.

It is estimated that a temperature change by 4° C. from 20° C. to 16° C. causes the acoustic velocity to fluctuate by 15%, and as a result, it is estimated that a window region of a high frequency region shifts by 15% as denoted by reference signs 1404, 1406. For example, the transmission loss at a frequency of 150 kHz indicated by the arrow in FIG. 16 is 0.6 dB (1 dB or less) at a water temperature of 20° C., but increases to 3.5 dB at a water temperature of 16° C. Such a change in characteristics has a large impact on system performance.

Accordingly, the technology of U.S. Pat. No. 4,997,705 described above is capable of expanding the transmission bandwidth in the acoustic transmission member, but cannot attain a practically sufficient (adaptable to change in characteristics due to temperature change as described above) bandwidth in the high frequency band.

In Japan Patent No. 2015-098086, an acoustic transmission member that includes N+1 layers of core layers and an N layers of intermediate layers being alternately layered between two skin layers is described.

Figure 17:
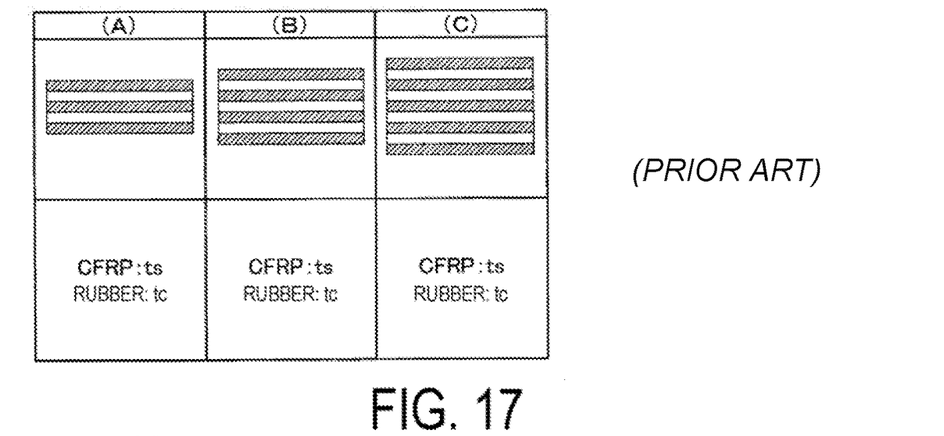
FIG. 17 is an explanatory drawing illustrating a structure of an acoustic transmission member according to Japan Patent No. 2015-098086.

FIG. 17 is an explanatory diagram illustrating a structure of the acoustic transmission member according to Japan Patent No. 2015-098086. In acoustic transmission members A, B, C in which the N is 1, 2, 3, respectively illustrated in FIG. 17, natural rubber is used for the core layers, and carbon fiber reinforced plastics (CFRP) is used for the skin layers and the intermediate layer, respectively.

Figure 18:
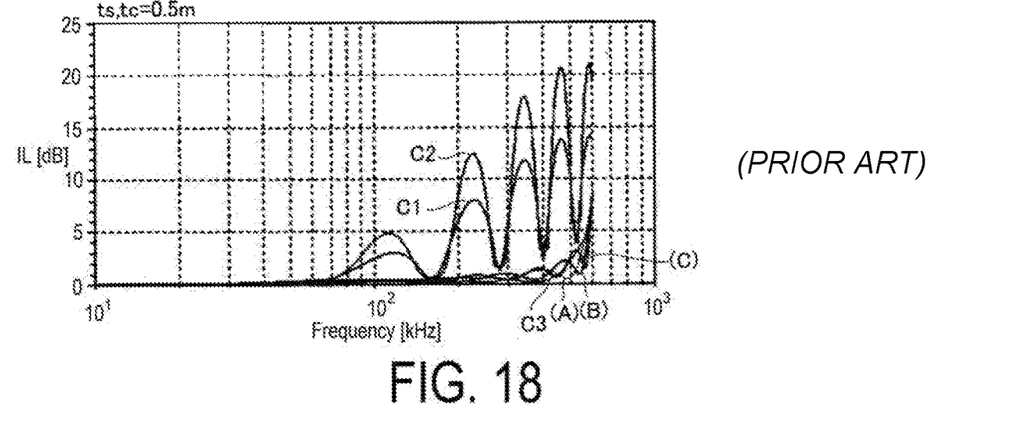
FIG. 18 is a graph showing transmission characteristics of the acoustic transmission member illustrated in FIG. 17.

FIG. 18 is a graph showing transmission characteristics of the acoustic transmission members (Japan Patent No. 2015-098086) illustrated in FIG. 17.

In FIG. 18, the vertical axis indicates transmission loss IL, and the horizontal axis indicates frequency.

As illustrated in FIG. 18, the acoustic transmission members A, B, C according to Japan Patent No. 2015-098086 has superior acoustic transmission characteristics even in the high frequency band compared to simple sandwich structures (A sandwich structure) such as C1.

However, the acoustic transmission members A, B, C according to Japan Patent No. 2015-098086 have a thin film structure that does not allow the necessary strength and rigidity to be easily ensured. Increasing strength and rigidity via multilayering has been considered, but this increases manufacture difficulties and cost.

Additionally, to exhibit uniformly good acoustic transmission characteristics in the frequency band to use, external noise is transmitted in a frequency band lower than the frequency band to use. This may cause deterioration in the noise resistance of the system.

SUMMARY

The present technology provides an acoustic transmission member that provides a wide acoustic transmission band suitable for a high frequency region and ensures a certain strength.

Provided is an acoustic transmission member with a planar shape having a predetermined acoustic frequency band as a transmission frequency band, the acoustic transmission member including a core layer layered between two skin layers, wherein the skin layers are formed of a material having a higher elastic modulus than a material of the core layer, and a thickness ds of the skin layers satisfying Equation (1), where f is a center frequency of the transmission frequency band, cw is an acoustic velocity in a medium surrounding the acoustic transmission member, $\lambda$ is a wavelength corresponding to the center frequency in the medium, Cds is a longitudinal wave acoustic velocity in the skin layers, and n is a discretionary natural number.

$$ds = \frac{n}{2}\frac{Cds}{cw}\lambda = \frac{n}{2}\frac{Cds}{f} \quad (1)$$

In the acoustic transmission member according to the technology of claim 2, the skin layer is formed of a material having an elastic modulus from 100 MPa to 350 GPa.

In the acoustic transmission member according to the technology of claim 3, the skin layer is formed by including any one of fiber reinforced plastic, plastic, and metal.

In the acoustic transmission member according to the technology of claim 4, the core layer is formed of a viscoelastic member or plastic.

In the acoustic transmission member according to the technology of claim 5, the core layer is formed to have a density and elastic modulus being at predetermined values by injecting glass microballoons into the viscoelastic member or the plastic.

In the acoustic transmission member according to the technology of claim 6, a difference between an acoustic impedance of a material forming the core layer is within a range of ±50% of an acoustic impedance of the medium.

In the acoustic transmission member according to the technology of claim 7, the medium is a liquid, and a material forming the core layer is a liquid having an acoustic impedance within a range of ±50% of an acoustic impedance of the liquid.

In the acoustic transmission member according to the technology of claim 8, a thickness dc of the core layer and the wavelength $\lambda$ satisfy $0.0675 \leq dc/\lambda \leq 5.4$.

In the acoustic transmission member according to the technology of claim 9, a protective layer is formed on a surface of the skin layer.

A method of designing an acoustic transmission member according to the technology of claim 10 is provided, the acoustic transmission member having a planar shape, including a core layer layered between two skin layers, and having a first acoustic frequency band as a transmission frequency band and a second acoustic frequency band as a shielded frequency band, the method including:

a skin layer thickness determining step of determining a thickness ds of the skin layers using Equation (1); a transmission loss measuring step of measuring or calculating transmission losses of each layer formed by layering a core layer having varied thickness, successively on the skin layers with a thickness determined in the skin layer thickness determining step; and a core layer thickness determining step of determining a thickness of a core layer with a maximal value of transmission loss, among the transmission losses measured or calculated, being closest to a center frequency of a shielded frequency band as a thickness of the core layer of the acoustic transmission member, in Equation (1), f is a center frequency of the transmission frequency band, cw is an acoustic velocity in a medium surrounding the acoustic transmission member, $\lambda$ is a wavelength corresponding to the center frequency in the medium, Cds is a longitudinal wave acoustic velocity in the skin layers, and n is a discretionary natural number.

$$ds = \frac{n}{2}\frac{Cds}{cw}\lambda = \frac{n}{2}\frac{Cds}{f} \quad (1)$$

A method of designing an acoustic transmission member according to the technology of claim 11 is provided, the acoustic transmission member having a planar shape, including a core layer layered between two skin layers, having a predetermined acoustic frequency band as a transmission frequency band, and a predetermined required strength and rigidity, the method including:

a skin layer thickness determining step of determining a thickness ds of the skin layers using Equation (1); and a core layer thickness determining step of calculating a thickness of the core layer having strength satisfying the required strength and rigidity when layered between the skin layers with a thickness determined in the skin layer thickness determining step, where in Formula (1), f is a center frequency of the transmission frequency band, cw is an acoustic velocity in a medium surrounding the acoustic transmission member, $\lambda$ is a wavelength corresponding to the center frequency in the medium, Cds is a longitudinal wave acoustic velocity in the skin layers, and n is a discretionary natural number.

$$ds = \frac{n}{2}\frac{Cds}{cw}\lambda = \frac{n}{2}\frac{Cds}{f} \quad (1)$$

In the method of designing an acoustic transmission member according to the technology of claim 12, a thickness dc of the core layer and the wavelength $\lambda$ satisfy $0.0675 \leq dc/\lambda \leq 5.4$.

In the method of designing an acoustic transmission member according to the technology of claim 13, the skin layers are formed of a material having a higher elastic modulus than a material of the core layer.

According to the technology of claim 1, the skin layers have a half-wavelength structure, allowing the acoustic transmission member to be formed with good transmission characteristics at a center frequency irrespective of the thickness of the core layer and is advantageous in that the degree of freedom in designing the acoustic transmission member is improved. Additionally, this is advantageous in that a certain wide transmission band can be ensured at a center frequency, and is adaptable to temperature change in the surrounding medium due to temperature change. Furthermore, the function of shielding acoustic waves outside of the center frequency is provided. This is advantageous in that noise resistance of the acoustic transmission member is improved.

According to the technology of claim 2, the skin layer and the intermediate layer can be formed of various materials.

According to the technology of claim 3, excellent acoustic transmission characteristics can be obtained and strength of the acoustic transmission member can be ensured.

According to the technology of claim 4, excellent acoustic transmission characteristics can be obtained and strength of the acoustic transmission member can be ensured.

According to the technology of claim 5, the core layer can be formed having any density and elastic modulus.

According to the technology of claim 6, reflection at the boundary can be reduced and acoustic transmission characteristics can be improved.

According to the technology of claim 7, the same type of fluid with the fluid surrounding the acoustic transmission member can be used as core layer. This is advantageous in that the difference in acoustic impedance between the surrounding fluid and the core layer can be decreased.

The technologies of claims 8 and 12 are advantageous in that an acoustic transmission member having good transmission characteristics at a center frequency can be formed more reliably.

According to the technology of claim 9, the protective layer can reduce the effect of pressure from the surrounding medium and the effect of marine organisms, and improve the strength of the acoustic transmission member.

According to the technology of claim 10, an acoustic transmission member can be formed in that the skin layers have a half-wavelength structure to provide good transmission characteristics at a discretionary frequency band, also has good shielding characteristics at a discretionary frequency band due to the thickness of the core layer being able to be adjusted.

According to the technology of claim 11, an acoustic transmission member can be formed in that the skin layers have a half-wavelength structure to provide good transmission characteristics at a discretionary frequency band, also has a desired strength and rigidity due to the thickness of the core layer being able to be adjusted.

DETAILED DESCRIPTION

Acoustic transmission members according to preferred embodiments of the present technology are described in detail below with reference to the accompanying drawings.

Figure 14:
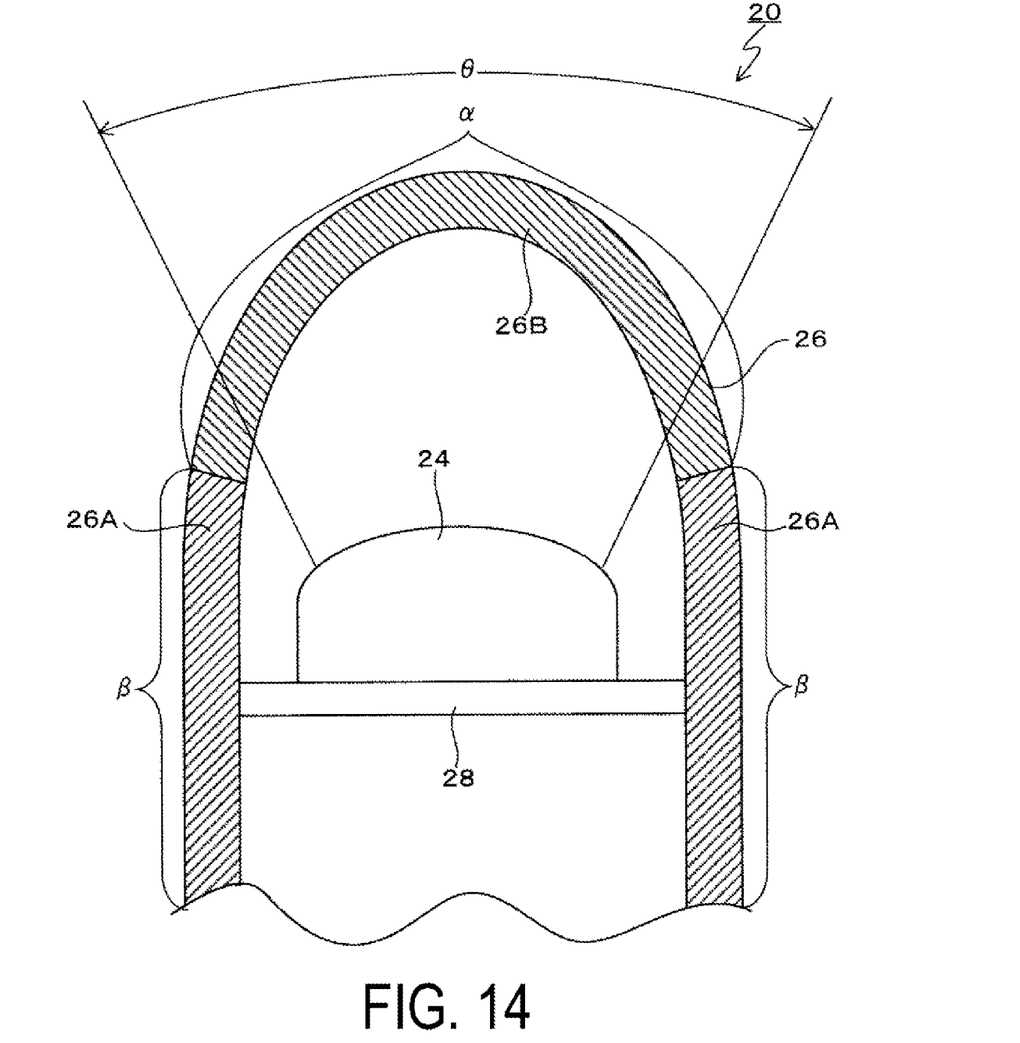
FIG. 14 is an explanatory diagram illustrating a configuration of a marine sonar device 20 installed with an acoustic transmission member.

FIG. 14 is an explanatory diagram illustrating a configuration of a marine sonar device 20 installed with an acoustic transmission member. The acoustic transmission member according to the present technology is used in order to form an acoustic transmission region α in the sonar device 20, for example.

The sonar device 20 is disposed at a leading end of a sonar device support platform (not illustrated) provided to the body of a vessel.

The sonar device 20 includes a transducer 24 and an acoustic window 26.

The transducer 24 is mounted on a frame 28 made of fiber reinforced plastics (FRP) supported in an inside portion surrounded by the acoustic window 26, and is disposed towards the front direction of the vessel.

The acoustic window 26 is configured to protect the transducer 24 and is provided so as to cover the transducer 24, with water filling the inside portion surrounded by the acoustic window 26.

The acoustic window 26 has a cylindrical portion 26A, and a curved surface portion 26B that is formed in a curved shape that protrudes toward the front from the tip of the cylindrical portion 26A.

The frame 28 on which the transducer 24 is mounted is supported in the inside portion surrounded by the cylindrical portion 26A.

The acoustic window 26 has the acoustic transmission region α that enables acoustic transmission, and an acoustic insulation region β that blocks sound.

The curved surface portion 26B of the acoustic window 26 that constitutes the acoustic transmission region α is made of the acoustic transmission member according to the present technology.

The cylindrical portion 26A of the acoustic window 26 constituting the acoustic insulation region β is constituted of an acoustic insulating material that blocks sound (this includes reducing oscillation noise). As such an acoustic insulating material, various known materials can be used such as a viscoelastic member (air bubbles dispersion type acoustic insulating material) such as rubber or polyurethane with air bubbles (vinyl-based microballoons) mixed in, or a material in which thin rubber plates sandwiching a thin rubber plate with many small holes provided therethrough (air hole-type acoustic insulating material) on both surfaces.

In the present embodiment, the acoustic transmission region α is the entirety of the curved surface portion 26B excluding edge portions of the curved surface portion 26B that are located near the cylindrical portion 26A, and a range θ illustrated in FIG. 14 is the range in which the transducer 24 searches for obstacles in the front such as whales and driftwood.

Next, the acoustic transmission member constituting the acoustic transmission region α will be described.

Figure 1:
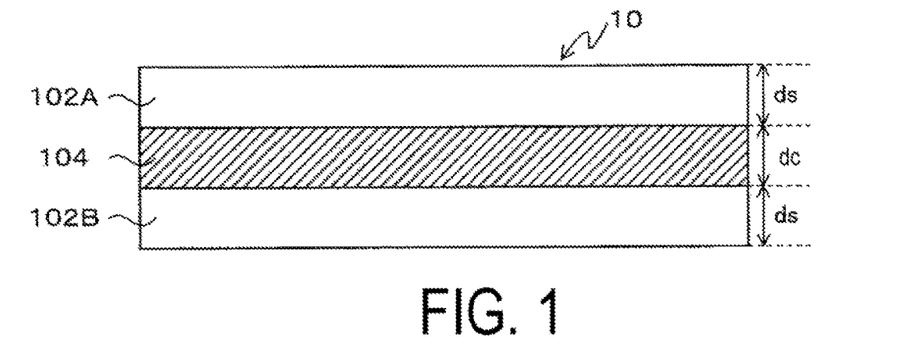
FIG. 1 is a cross-sectional view illustrating a configuration of an acoustic transmission member 10 according to an embodiment.

FIG. 1 is a cross-sectional view illustrating a configuration of an acoustic transmission member 10 according to an embodiment.

In the description below, for ease of explanation, the acoustic transmission member 10 is illustrated as having a planar shape, but the acoustic transmission member 10 can be molded in any shape depending on the application.

The acoustic transmission member 10 has a planar shape and acoustic transmission properties. The acoustic transmission member 10 has a predetermined acoustic frequency band as a transmission frequency band, with f defined as the center frequency of the transmission frequency band.

The acoustic transmission member 10 includes a core layer 104 layered between two skin layers 102A, 102B. More specifically, the skin layer 102A, the core layer 104, and the skin layer 102B are layered in the described order from the upper side of FIG. 1.

Protective layers may further be provided on the surfaces of the skin layers 102A, 102B, that is, the surfaces of the two skin layers 102A, 102B opposite to the surfaces bonding the core layer 104. Such protective layers are provided in order to protect the sonar device 20 from external loads or to evade from marine organisms, for example.

Additionally, a protective layer may be provided on only on surface of one of the skin layers 102A, 102B.

Next, the materials of the respective layers will be described.

The skin layers 102A, 102B are formed of a material with a higher elastic modulus than the core layer 104.

The skin layers 102A, 102B are formed of a material with an elastic modulus from 100 MPa to 350 GPa, for example. This is because the material having an elastic modulus of less than 100 MPa makes it difficult to maintain the layers as structural members, and the material having an elastic modulus of greater than 350 GPa has too high of an acoustic impedance.

The skin layers 102A, 102B can specifically be formed using any of fiber reinforced plastics (FRP, glass fiber reinforced plastics (GFRP), carbon fiber reinforced plastics (CFRP), or the like), plastic, or metal (copper, titanium, or the like).

Also, the core layer 104 is formed of a viscoelastic member such as rubber or polyurethane, or plastic, for example.

The core layer 104 may be formed to have a density and elastic modulus being at desired values (predetermined values) by injecting glass microballoons into the above-described viscoelastic member or plastic.

It is preferable that the difference in acoustic impedance between the material forming the core layer 104 and the medium surrounding the acoustic transmission member 10 (fresh water or seawater in the present embodiment) be within a range of ±50%.

Specifically, the acoustic impedance is calculated as the product ρc of a material density ρ and a longitudinal wave acoustic velocity c. In other words, the acoustic impedance of the material forming the core layer 104 is calculated as a product $\rho 1 c1$ of a density $\rho 1$ of the material forming the core layer 104 and the longitudinal wave acoustic velocity c1 in the material forming the core layer 104. The acoustic impedance of the medium surrounding the acoustic transmission member 10 is calculated as a product $\rho 2 c2$ of a density $\rho 2$ of the medium surrounding the acoustic transmission member 10 and the longitudinal wave acoustic velocity c2 in the same medium.

It is preferable that the density and elastic modulus of the core layer 104 be adjusted such that the difference between the acoustic impedance $\rho 1 c1$ of the material forming the core layer 104 and the acoustic impedance $\rho 2 c2$ of the medium surrounding the acoustic transmission member 10 is within a range of ±50%.

This is because when the difference between the acoustic impedance $\rho 1 c1$ of the material forming the core layer 104 and the acoustic impedance $\rho 2 c2$ of the medium surrounding the acoustic transmission member 10 is too great, the boundary becomes highly reflective, reducing the acoustic transmission properties.

In the present embodiment, the medium surrounding the acoustic transmission member 10 is a liquid such as fresh water or seawater. Accordingly, the material constituting the core layer 104 may be a liquid with a difference in acoustic impedance within range of ±50% of the acoustic impedance of the surrounding fluid, specifically, the same type of liquid as the surrounding fluid.

In other words, fresh water, sea water, or the like being the surrounding fluid may be inserted between the skin layers 102A, 102B to form the core layer 104. Note that in a configuration in which the surrounding fluid is sea water, fresh water is preferably used to reduce the chances of corrosion and the like.

Next, the thicknesses of the respective layers will be described.

A thickness ds of the skin layers 102A, 102B is formed such that Equation (1) below is satisfied, where f is the center frequency of the transmission frequency band of the acoustic transmission member 10, cw is the acoustic velocity in the medium surrounding the acoustic transmission member 10, λ is the wavelength corresponding to the center frequency f in the medium, Cds is the longitudinal wave acoustic velocity in the skin layer, and n is a discretionary natural number.

$$ds = \frac{n}{2} \frac{Cds}{cw} \lambda = \frac{n}{2} \frac{Cds}{f} \qquad (1)$$

The skin layers 102A, 102B that satisfy Equation (1) above take a half-wavelength structure with respect to the center frequency to minimize acoustic transmission loss. By selecting such a thickness, the acoustic transmission member 10 can be formed with good transmission characteristics with respect to the transmission frequency band irrespective of the thickness of the core layer 104.

The thickness dc of the core layer 104 is preferably set in relation to the wavelength λ corresponding to the center frequency f in the medium to satisfy $0.05 \leq dc/\lambda \leq 5.4$.

In varying the thickness dc of the core layer 104 as described below, the present inventors determined that by satisfying the range described above allows good acoustic transmission characteristics to be achieved.

EXAMPLES

The characteristics of acoustic transmission members according to the present technology will be described in detail below.

Figure 2:
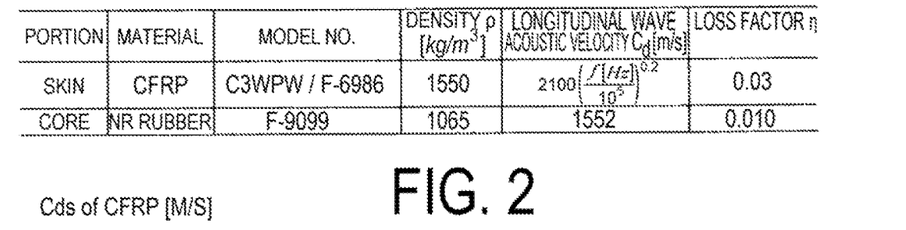
FIG. 2 is a table listing material constants of each material for forming skin layers 102A, 102B and a core layer 104.

In the examples below, CFRP (prepreg C3WPW/F-6986) was used for the skin layers 102A, 102B, and natural rubber F-9099 was used for the core layer 104. The materials and constants of the materials are listed in FIG. 2.

Figure 3:
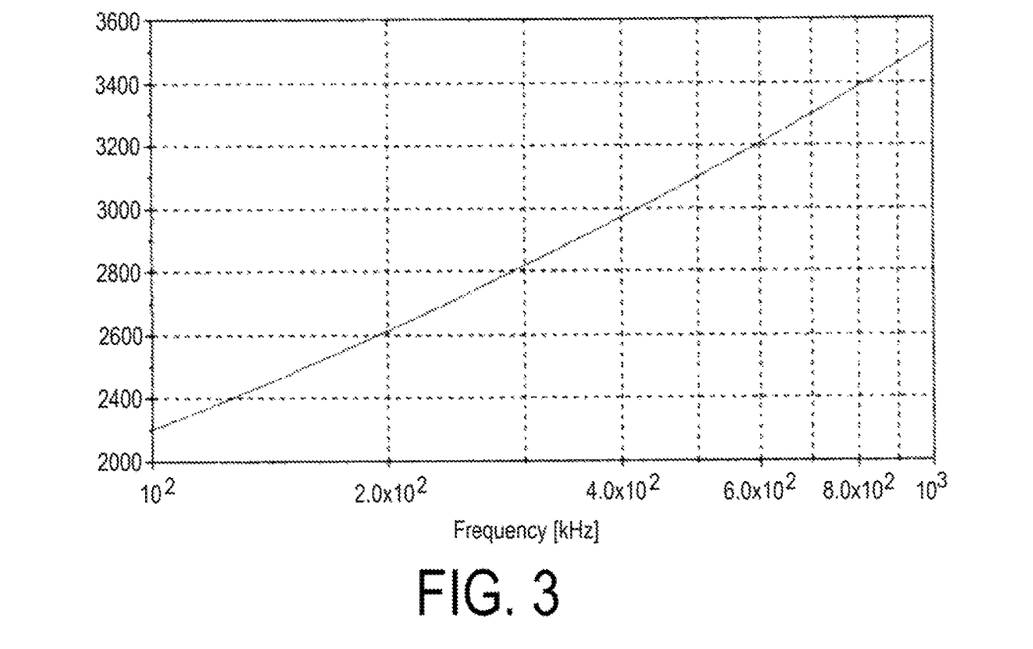
FIG. 3 is a graph showing frequency characteristics of the longitudinal wave acoustic velocity in a carbon fiber reinforced plastic (CFRP).

Additionally, the longitudinal wave acoustic velocity in the CFRP, i.e., the skin layers 102A, 102B, is shown in FIG. 3. The vertical axis indicates longitudinal wave acoustic velocity in the CFRP, and the horizontal axis indicates frequency (kHz). The acoustic velocity in the CFRP is assumed to have the frequency characteristics. Specifically, it is assumed to be 1830 m/s at 50 kHz and 2900 m/s at 500 kHz, for example.

First, the acoustic transmission member 10 with a center frequency of 50 kHz will be discussed.

Figure 4:
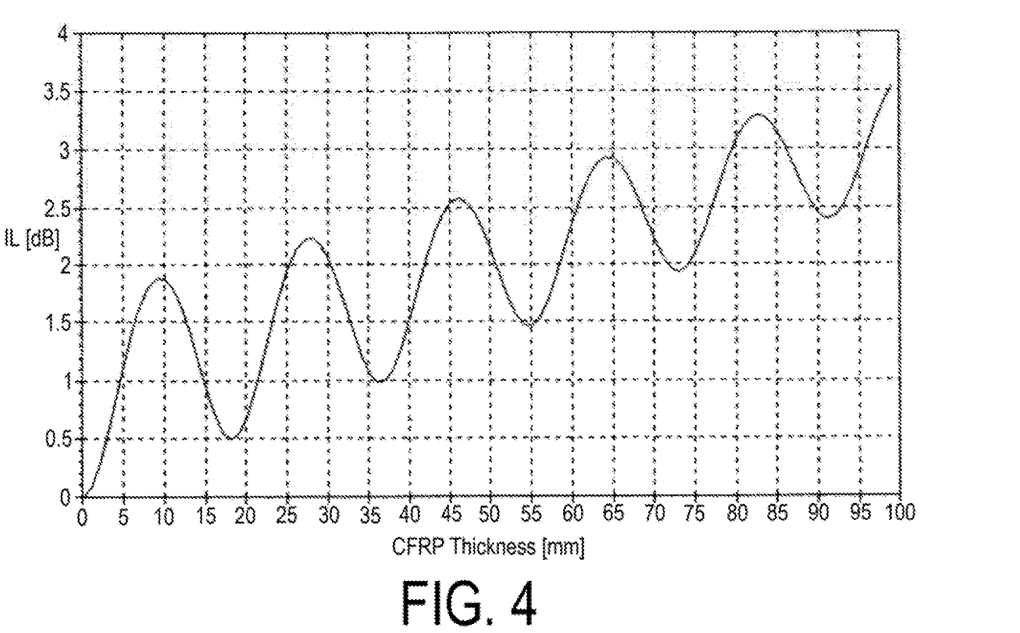
FIG. 4 is a graph showing transmission loss characteristics of a single layer plate of the CFRP for acoustic waves of 50 kHz.

FIG. 4 is a graph showing the transmission loss (IL) of a single layer plate of the CFRP (skin layers 102A, 102B) for acoustic waves of 50 kHz.

In the graph of FIG. 4, the vertical axis indicates transmission loss (dB) and the horizontal axis indicates thickness of the CFRP plate (mm).

As illustrated in FIG. 4, the CFRP plate has a thickness whereby transmission loss periodically decreases. The thickness to obtain a minimal value is the skin layer thickness calculated from Equation (1) above. For example, when n=1 in Equation (1) above, the minimal value corresponds to at or near a CFRP plate thickness of 18 mm, and when n=2, the minimal value corresponds to at or near a CFRP plate thickness of 36 mm.

Figure 5:
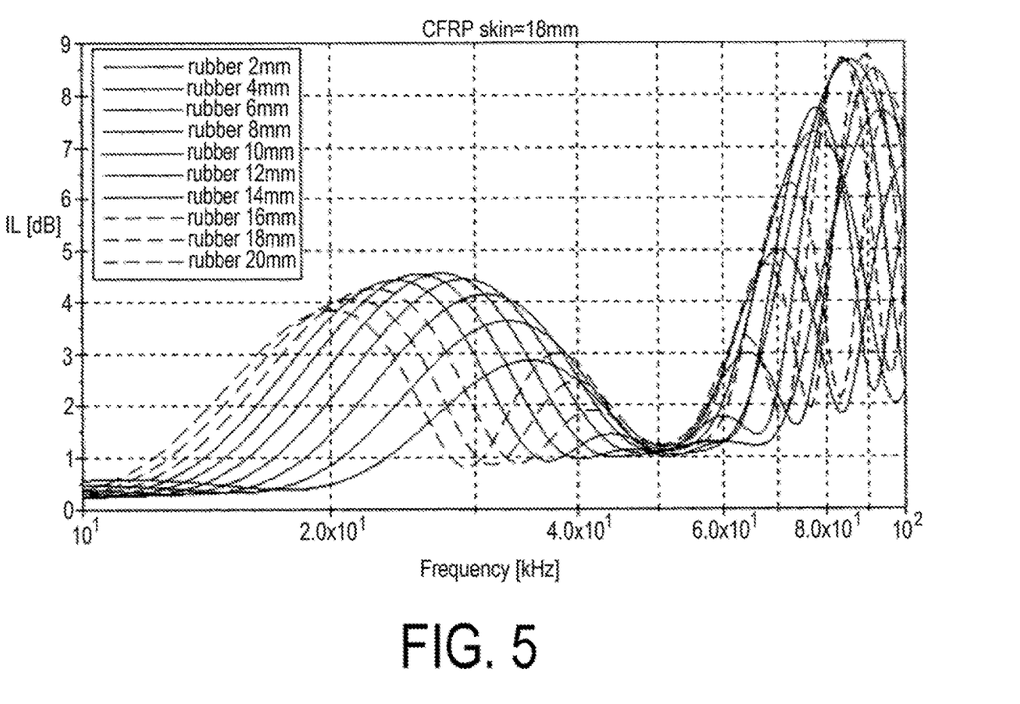
FIG. 5 is a graph showing transmission loss characteristics of acoustic transmission members 10 with a skin layer thickness of 18 mm.

FIG. 5 is a graph showing the transmission loss (IL) of the acoustic transmission members 10 of examples with various core layer thicknesses and a fixed skin layer thickness.

FIG. 5 shows the transmission loss (IL) characteristics calculated with the thickness of the skin layers 102A, 102B set to 18 mm corresponding to n=1 and the thickness of the core layer 104 ranging from 2 mm to 20 mm in 2 mm increments.

In the graph of FIG. 5, the vertical axis indicates transmission loss (dB), and the horizontal axis indicates frequency (kHz). In other words, each of the acoustic transmission members 10 has properties by which sounds in a frequency band with a small transmission loss are transmitted, and sounds in a frequency band with a large transmission loss cut-off.

As seen from FIG. 5, the acoustic transmission members 10 in which the thickness of the skin layers 102A, 102B was 18 mm achieve good transmission characteristics at or near 50 kHz irrespective of the thickness of the core layer 104.

Also, as seen from the characteristics curve, the transmission loss is high each on the low frequency side and the high frequency side of the center frequency, i.e., 50 kHz. This has the effect of shielding acoustic waves in bands outside of the center frequency.

Next, the acoustic transmission member 10 with a center frequency of 500 kHz will be discussed.

Figure 6:
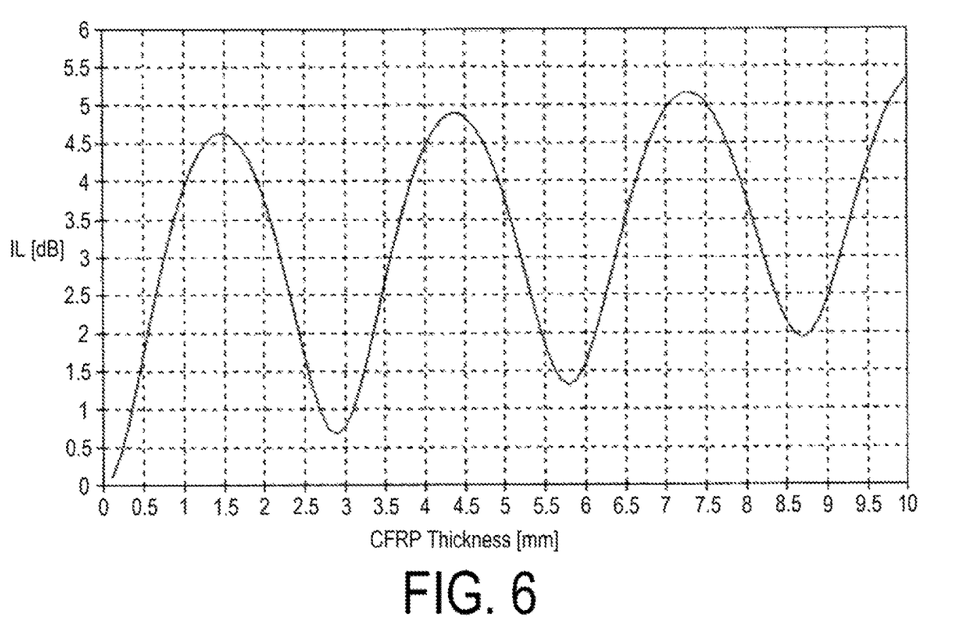
FIG. 6 is a graph showing transmission loss characteristics of a single layer plate of the CFRP for acoustic waves of 500 kHz.

FIG. 6 is a graph showing the transmission loss (IL) of a single layer plate of the CFRP (skin layers 102A, 102B) with respect to acoustic waves of 500 kHz.

In the graph of FIG. 6, the vertical axis indicates transmission loss (dB) and the horizontal axis indicates thickness of the CFRP plate (mm).

When using 500 kHz, the thickness of the CFRP plate to obtain a minimal value for transmission loss is 2.9 mm (n=1), 5.8 mm (n=2), and so on. This value is in accordance with Equation (1) above.

Figure 7:
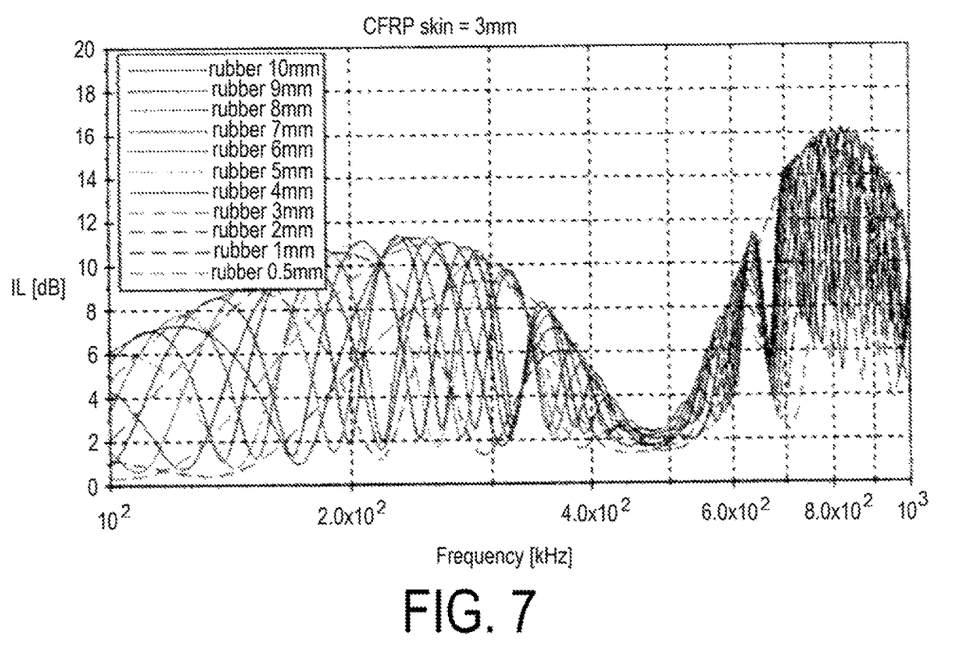
FIG. 7 is a graph showing transmission loss characteristics of acoustic transmission members 10 with a skin layer thickness of 3 mm.
Figure 8:
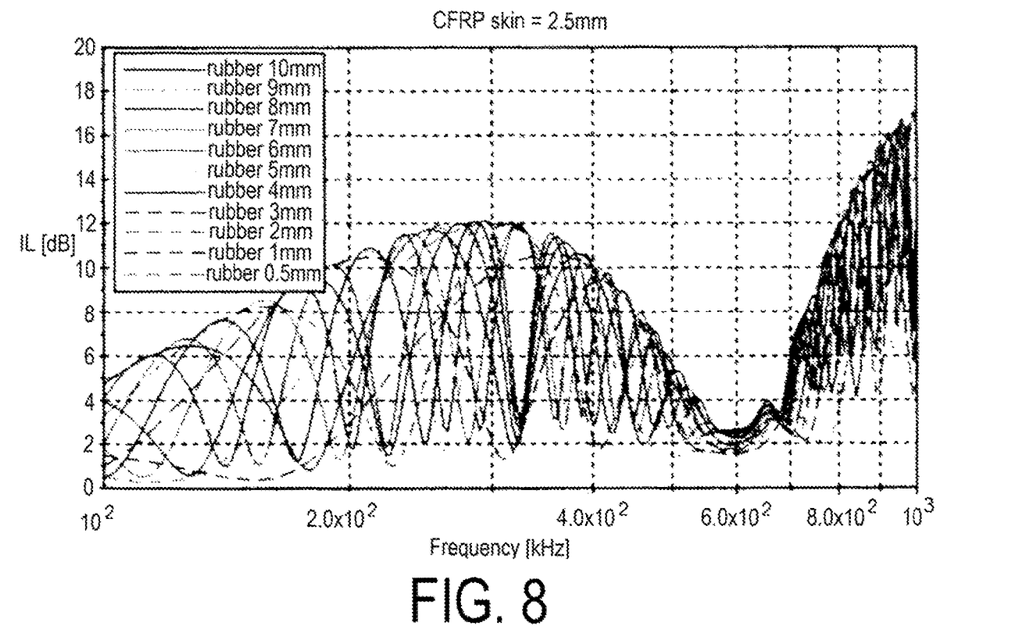
FIG. 8 is a graph showing transmission loss characteristics of acoustic transmission members 10 with a skin layer thickness of 2.5 mm.

FIG. 7 is a graph showing the transmission loss characteristics of the acoustic transmission members 10 of examples with various core layer thicknesses and the skin layer thickness fixed at 3 mm. FIG. 8 is a graph showing the transmission loss characteristics of the acoustic transmission members 10 of examples with various core layer thicknesses and the skin layer thickness fixed at 2.5 mm.

Note that in FIGS. 7 and 8, the thickness of the core layer 104 ranges from 0.5 mm to 10 mm in 1 mm increments.

As described above, the thickness of the CFRP plate to obtain a minimal value for transmission loss with the acoustic waves at 500 kHz is 2.9 mm. Thus, the trough of the minimal value is not on 500 kHz in both FIG. 7 (3 mm) and FIG. 8 (2.5 mm). However, when looking also at FIGS. 9 to 11, it can be seen that as the thickness of the CFRP plate decreases, the trough of the minimal value moves toward higher frequencies, validifying Equation (1). Specifically, in FIG. 7 (3 mm), the trough of the minimal value is in a section very close to 500 kHz.

Solving Equation (1) above with an acoustic velocity approaching 2900 m/s at a longitudinal wave acoustic velocity of 500 kHz in the CFRP plate, the center frequency for the 3 mm-CFRP plate thickness of FIG. 7 is 483 kHz and the center frequency for the 2.5 mm-CFRP plate thickness of FIG. 8 is 580 kHz. The trough of the minimal value in these graphs are roughly in the same position. Thus, it can be assumed that by setting the CFRP plate thickness to approximately 2.9 mm, an acoustic transmission member with the desired 500 kHz as the center frequency can be obtained.

Note that should the specifications of the acoustic transmission member 10 such as required dimensions and plate material dictate that the CFRP plate thickness cannot be a value in accordance with Equation (1) above, the thickness of the core layer 104 can be adjusted to obtain sufficient transmission performance at the center frequency.

For example, a CFRP plate with a thickness of 3 mm like that of FIG. 7 or a CFRP plate with a thickness of 2.5 mm can be used to form an acoustic transmission member 10 with a center frequency of 500 kHz.

Figure 12:
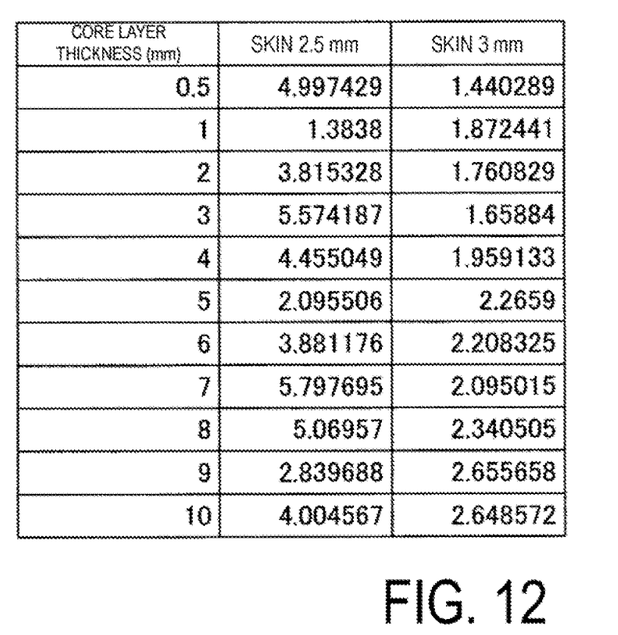
FIG. 12 is a table listing the transmission loss at 500 kHz of the acoustic transmission members 10 with a skin layer thickness of 2.5 mm and 3.0 mm.

FIG. 12 is a table listing the transmission loss (unit: dB) at 500 kHz of the acoustic transmission members 10 formed using a CFRP plate with a thickness of 2.5 mm and a CFRP plate with a thickness of 3.0 mm.

From FIG. 12, the following six configurations resulting in a transmission loss of 2 dB or less is extracted: (skin layer thickness/core layer thickness) 2.5 mm/1.0 mm, 3.0 mm/0.5 mm, 3.0 mm/1.0 mm, 3.0 mm/2.0 mm, 3.0 mm/3.0 mm, 3.0 mm/4.0 mm.

Figure 13:
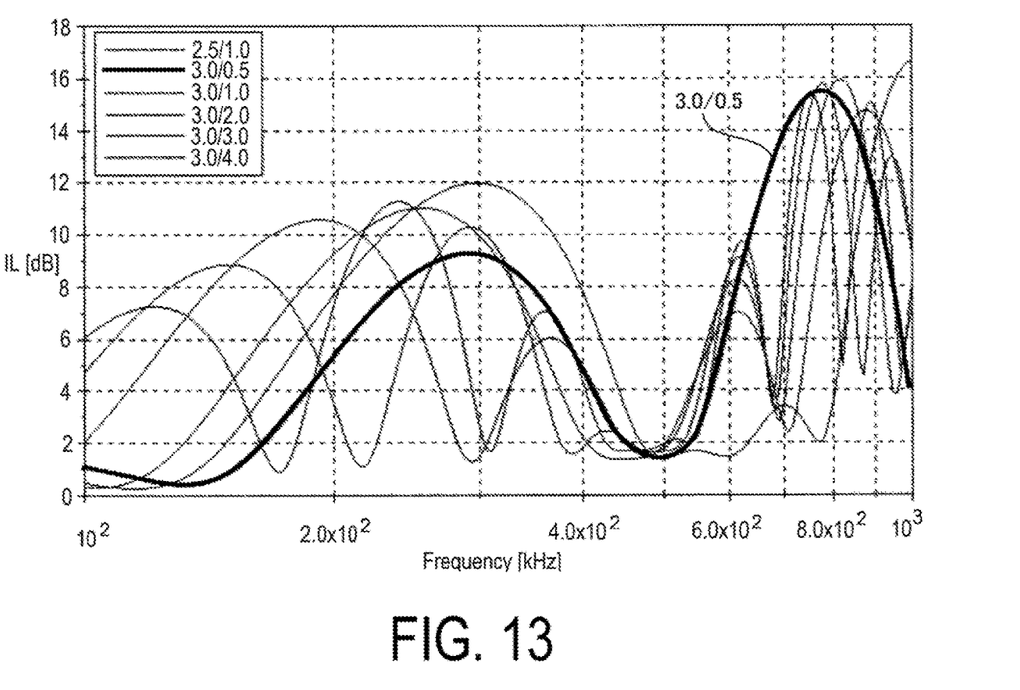
FIG. 13 is a graph showing transmission characteristics of the acoustic transmission members 10 with good transmission characteristics at 500 kHz extracted from FIG. 12.

FIG. 13 is a graph showing transmission characteristics of the acoustic transmission members 10 with good transmission characteristics at 500 kHz extracted from FIG. 12.

In particular, the combination of skin layer thickness 3.0 mm/core layer 0.5 mm is the best of this group. With this combination, the transmission loss at from 450 kHz to 540 kHz is 2 dB or less, and the high transmission bandwidth with a transmission loss of 2 dB or less is 18%.

In this way, values near but outside of the value calculated using Equation (1) for the skin layer thickness can be used in combination with adjusting the core layer thickness to form an acoustic transmission member 10 having sufficiently high transmission performance.

Figure 9:
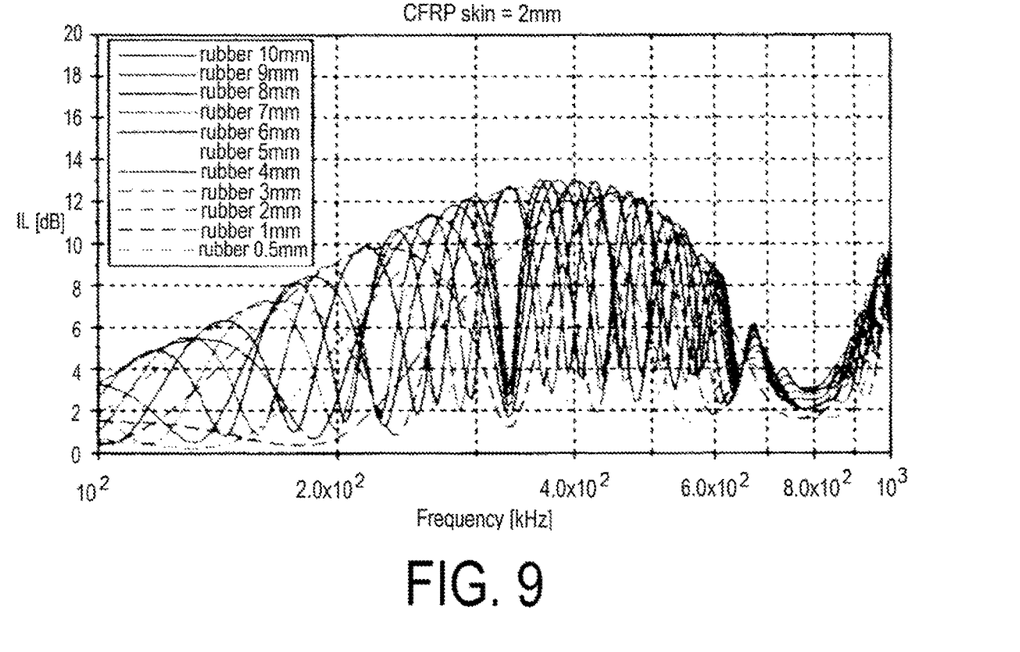
FIG. 9 is a graph showing transmission loss characteristics of acoustic transmission members 10 with a skin layer thickness of 2 mm.
Figure 10:
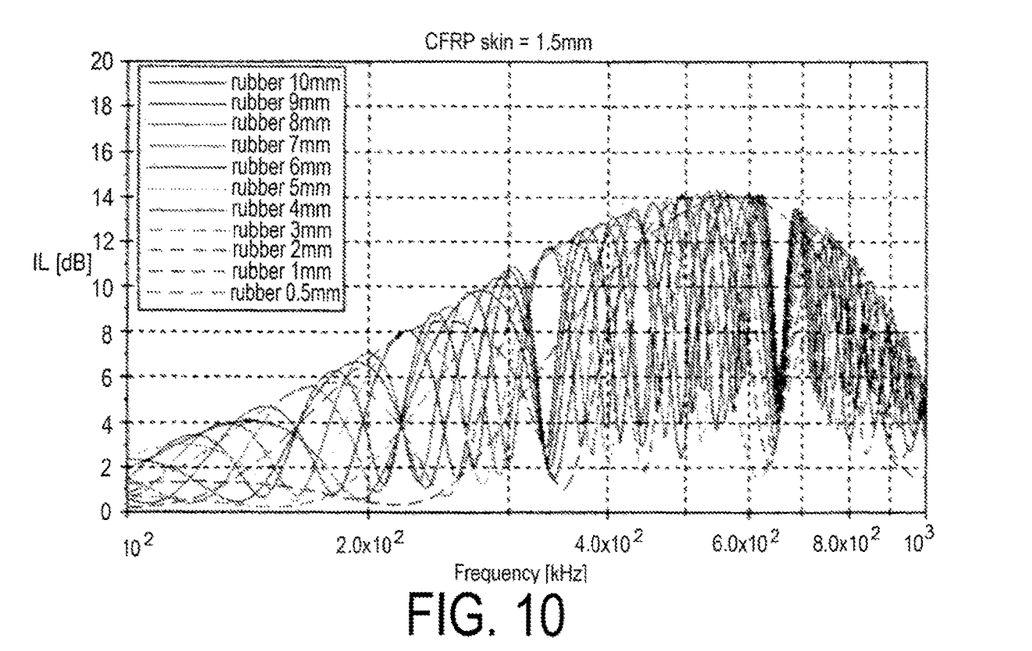
FIG. 10 is a graph showing transmission loss characteristics of acoustic transmission members 10 with a skin layer thickness of 1.5 mm.
Figure 11:
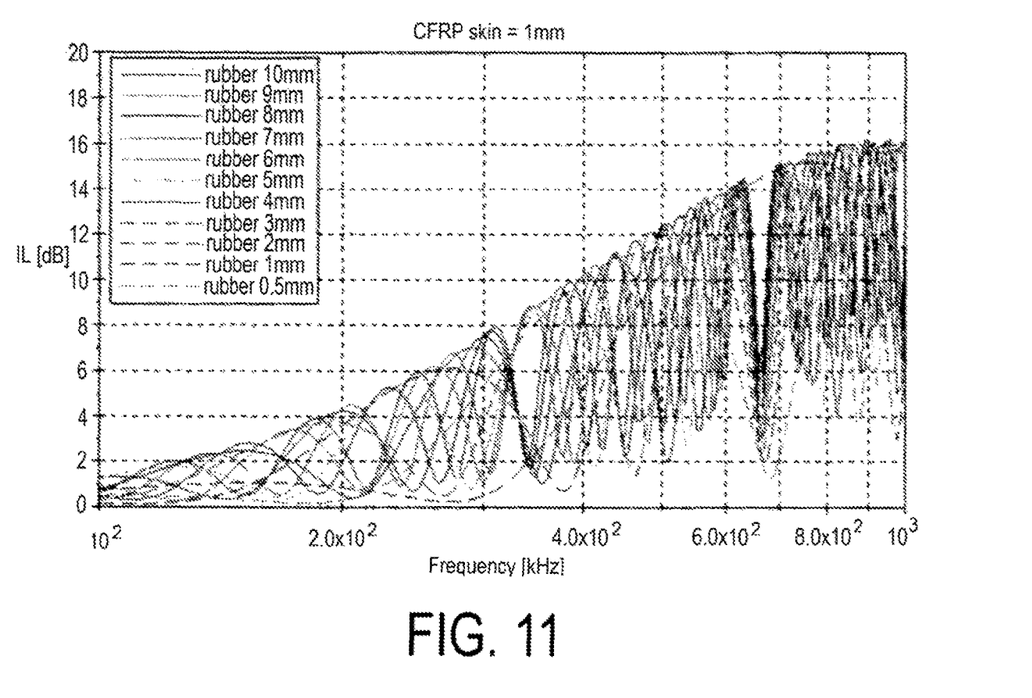
FIG. 11 is a graph showing transmission loss characteristics of acoustic transmission members 10 with a skin layer thickness of 1 mm.

FIGS. 9 to 11 are graphs showing the transmission loss of the acoustic transmission members 10 of examples with various core layer thicknesses and a fixed skin layer of 2 mm for FIG. 9, a fixed skin layer of 1.5 mm for FIG. 10, and a fixed skin layer of 1 mm for FIG. 11.

Note that in these drawings, the thickness of the core layer 104 ranges from 0.5 mm to 10 mm in 1 mm increments.

In FIG. 9, the trough of the minimal value is at or near 800 kHz. In FIGS. 10 and 11, the frequency at which the trough of the minimal value (transmission window) is formed is 1000 kHz or less, making the trough of the minimal value not seen in the drawings.

A Study of Core Layer Thickness

In FIG. 5, the skin layer thickness is fixed at 18 mm and the thickness dc of the core layer 104 ranges from 2 mm to 20 mm. Additionally, when the acoustic velocity in the surrounding medium (water in the present embodiment) is 1481 m/s, the wavelength $\lambda$ corresponding to a center frequency of 50 kHz is 29.6 mm.

Thus, the range of $dc/\lambda$ in FIG. 5 is from 0.0675 (2 mm) to 0.675 (20 mm).

In FIG. 9, the skin layer thickness is fixed at 2 mm and the thickness dc of the core layer 104 ranges from 0.5 mm to 10 mm. Additionally, when the acoustic velocity in the surrounding medium (water in the present embodiment) is 1481 m/s, the wavelength $\lambda$ corresponding to a center frequency of 800 kHz is 1.85 mm.

Thus, the range of $dc/\lambda$ in FIG. 9 is from 0.27 (0.5 mm) to 5.4 (10 mm).

From this, it can be seen that for the acoustic transmission member 10 according to an embodiment, by satisfying $0.0675 \leq dc/\lambda \leq 5.4$, where dc is the thickness of the core layer 104 and $\lambda$ is the wavelength corresponding to the center frequency f, an acoustic transmission member 10 having good transmission performance at the center frequency f can be formed.

Method of Designing Each Layer Thickness

In this way, in the acoustic transmission member 10, by adjusting the thickness of the skin layers 102A, 102B, a transmission frequency band with a center frequency of a discretionary frequency can be formed. Thus, the thickness of the skin layers 102A, 102B needs to merely be determined in accordance with the transmission frequency band required for the acoustic transmission member 10.

Additionally, the thickness of the core layer 104 may be determined as follows, for example.

(1) Determine the thickness of the core layer 104 in accordance with the strength and rigidity required for the acoustic transmission member 10.

As described above, the thickness of the core layer 104 can be set to a discretionary thickness. Thus, the thickness of the core layer 104 can be set to a discretionary thickness in accordance with the strength and rigidity required for the acoustic transmission member 10.

For example, when the required strength and rigidity is relatively high, the core layer 104 can be made relatively thick to ensure the required strength and rigidity. Also, when the required strength and rigidity is relatively low, the core layer 104 can be made relatively thin to achieve a reduction in weight and cost.

In other words, designing an acoustic transmission member having a predetermined transmission frequency band and required strength and rigidity includes a skin layer thickness determining step of determining the thickness ds of the skin layers 102A, 102B using Equation (1) above and a core layer thickness determining step of calculating the thickness of the core layer 104 having strength satisfying the required strength and rigidity described above when layered between the skin layers 102A, 102B with the thickness determined in the skin layer thickness determining step. An acoustic transmission member having desired transmission performance and required strength and rigidity can be designed with this method.

(2) Determine the thickness of the core layer 104 in accordance with the cut-off frequency band.

As illustrated in FIG. 5 and the like, the acoustic transmission member 10 of the present embodiment has a consistently small transmission loss at or near the center frequency. However, in frequency bands outside of the center frequency, the transmission loss performance varies greatly depending on the thickness of the core layer 104. In other words, the maximal value of the transmission loss varies with the thickness of the core layer 104.

Thus, by selecting a core layer thickness with the maximal value of transmission loss located at or near the desired cut-off frequency band, an acoustic transmission member 10 having desired transmission performance including cut-off performance can be formed.

In other words, designing an acoustic transmission member having a predetermined transmission frequency band and shielded frequency band includes a skin layer thickness determining step of determining the thickness ds of the skin layers 102A, 102B using Equation (1) above, a transmission loss measuring step of measuring or calculating the transmission loss of an each layer formed by layering the core layer 104 of varying thickness successively between the skin layers 102A, 102B with the thickness determined in the skin layer thickness determining step, and a core layer thickness determining step of determining the thickness of the core layer 104 with the maximal value of transmission loss, among the transmission losses measured or calculated in a previous step, being located closest to the center frequency of the shielded frequency band as a thickness of the core layer 104 of the acoustic transmission member 10. An acoustic transmission member having desired transmission performance and cut-off performance can be designed with this method.

In reality, these two methods are combined to design the acoustic transmission member. In other words, the strength and rigidity and the cut-off frequency band required for the acoustic transmission member are considered and a trade-off is made in determining the final design values.

As described above, the acoustic transmission member 10 according to an embodiment includes the skin layers 102A, 102B with a half-wavelength structure, allowing the acoustic transmission member 10 to be formed with good transmission characteristics at a center frequency irrespective of the thickness of the core layer 104 and is advantageous in that the degree of freedom in designing the acoustic transmission member 10 is improved.

Additionally, the acoustic transmission member 10 is advantageous in that a certain wide transmission band can be ensured at a center frequency, and is adaptable to temperature change in the surrounding medium due to temperature change.

Furthermore, the acoustic transmission member 10 has the function of shielding acoustic waves outside of the center frequency. This is advantageous in that noise resistance is improved.

The invention claimed is:

1. An acoustic transmission member with a planar shape having a predetermined acoustic frequency band as a transmission frequency band, the acoustic transmission member comprising:
a core layer layered between two skin layers,
wherein the skin layers are formed of a material having a higher elastic modulus than a material of the core layer;
a thickness ds of the skin layers satisfies Equation (1),
where f is a center frequency of the transmission frequency band, cw is an acoustic velocity in a medium surrounding the acoustic transmission member, $\lambda$ is a wavelength corresponding to the center frequency in the medium, Cds is a longitudinal wave acoustic velocity in the skin layers, and n is a discretionary natural number;

$$ds = \frac{n}{2}\frac{Cds}{cw}\lambda = \frac{n}{2}\frac{Cds}{f}. \quad (1)$$

2. The acoustic transmission member according to claim 1, wherein
the skin layer is formed of a material having the elastic modulus from 100 MPa to 350 GPa.

3. The acoustic transmission member according to claim 1, wherein
the skin layer is formed by including any one of fiber reinforced plastic, plastic, and metal.

4. The acoustic transmission member according to claim 1, wherein
the core layer is formed of a viscoelastic member or plastic.

5. The acoustic transmission member according to claim 4, wherein
the core layer is formed to have a density and elastic modulus being at predetermined values by injecting glass microballoons into the viscoelastic member or the plastic.

6. The acoustic transmission member according to claim 1, wherein
a difference between an acoustic impedance of a material forming the core layer is within a range of ±50% of an acoustic impedance of the medium.

7. The acoustic transmission member according to claim 1, wherein
the medium is a liquid, and
a material forming the core layer is a liquid having an acoustic impedance within a range of ±50% of an acoustic impedance of the liquid.

8. The acoustic transmission member according to claim 1, wherein
a thickness dc of the core layer and the wavelength $\lambda$ satisfy $0.0675 \le dc/\lambda \le 5.4$.

9. The acoustic transmission member according to claim 1, wherein
a protective layer is formed on a surface of the skin layer.

10. A method of designing an acoustic transmission member, the acoustic transmission member having a planar shape, including a core layer layered between two skin layers, and having a first acoustic frequency band as a transmission frequency band and a second acoustic frequency band as a shielded frequency band, the method comprising:
a skin layer thickness determining step of determining a thickness ds of the skin layers using Equation (1);
a transmission loss measuring step of measuring or calculating transmission losses of each layer formed by layering a core layer, having varied thickness, successively on the skin layers with a thickness determined in the skin layer thickness determining step; and
a core layer thickness determining step of determining a thickness of a core layer with a maximal value of transmission loss, among the transmission losses measured or calculated, being closest to a center frequency of a shielded frequency band as a thickness of the core layer of the acoustic transmission member, and
forming the acoustic transmission member including the skin layers with the skin layer thickness and the core layer with the core layer thickness,
where in Equation (1), f is a center frequency of the transmission frequency band, cw is an acoustic velocity in a medium surrounding the acoustic transmission member, $\lambda$ is a wavelength corresponding to the center frequency in the medium, Cds is a longitudinal wave acoustic velocity in the skin layers, and n is a discretionary natural number;

$$ds = \frac{n}{2}\frac{Cds}{cw}\lambda = \frac{n}{2}\frac{Cds}{f}. \quad (1)$$

11. A method of designing an acoustic transmission member, the acoustic transmission member having a planar shape, including a core layer layered between two skin layers, having a predetermined acoustic frequency band as a transmission frequency band, and a predetermined required strength and rigidity, the method comprising:
a skin layer thickness determining step of determining a thickness ds of the skin layers using Equation (1);
a core layer thickness determining step of calculating a thickness of the core layer having strength satisfying the required strength and rigidity when layered between the skin layers with a thickness determined in the skin layer thickness determining step, and
an acoustic transmission member forming step of forming the acoustic transmission member including the skin layers with the skin layer thickness and the core layer with the core layer thickness,
where in Equation (1), f is a center frequency of the transmission frequency band, cw is an acoustic velocity in a medium surrounding the acoustic transmission member, $\lambda$ is a wavelength corresponding to the center frequency in the medium, Cds is a longitudinal wave acoustic velocity in the skin layers, and n is a discretionary natural number;

$$ds = \frac{n}{2}\frac{Cds}{cw}\lambda = \frac{n}{2}\frac{Cds}{f}. \quad (1)$$

12. The method of designing an acoustic transmission member according to claim 11, wherein
a thickness dc of the core layer and the wavelength $\lambda$ satisfy $0.0675 \le dc/\lambda \le 5.4$.

13. The method of designing an acoustic transmission member according to claim 11, wherein
the skin layers are formed of a material having a higher elastic modulus than a material of the core layer.

14. The method of designing an acoustic transmission member according to claim 10, wherein a thickness dc of the core layer and the wavelength $\lambda$ satisfy $0.0675 \leq dc/\lambda \leq 5.4$.

15. The method of designing an acoustic transmission member according to claim 10, wherein
the skin layers are formed of a material having a higher elastic modulus than a material of the core layer.

* * * * *